Nov. 5, 1963   W. T. HARRIS   3,109,973
DIFFERENTIAL MAGNETOSTRICTIVE ACTUATOR
Filed June 9, 1958
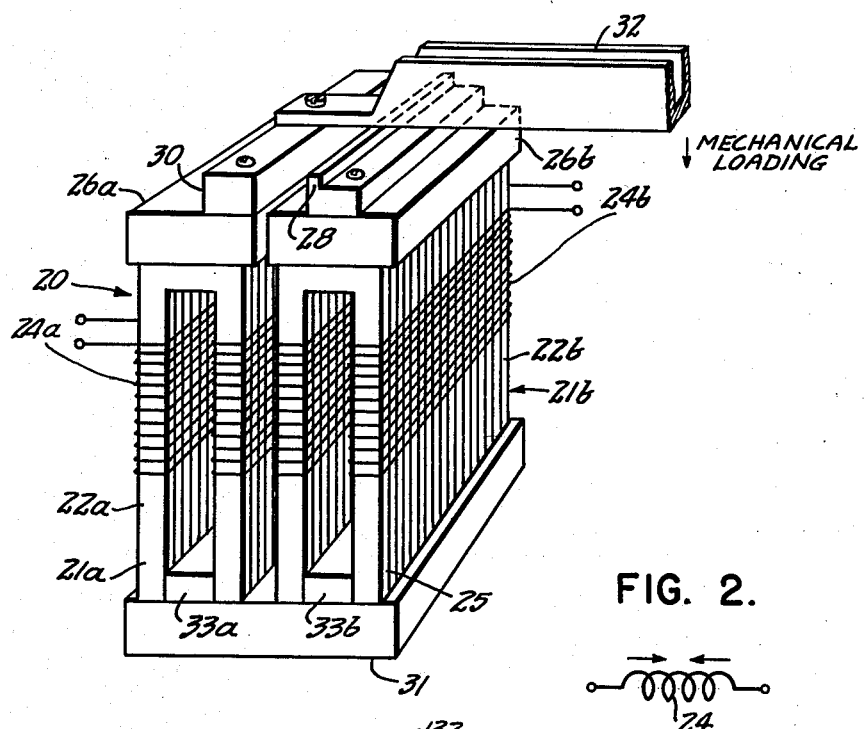
FIG. 1.
FIG. 2.
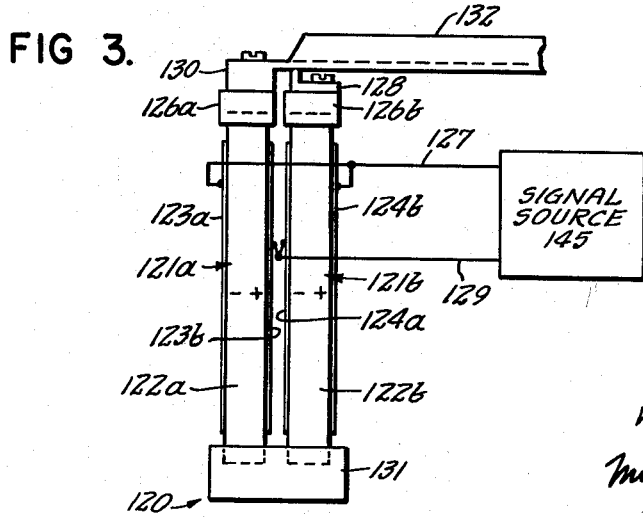
FIG 3.
INVENTOR
WILBUR T. HARRIS
BY
Mitchell T Bechert
ATTORNEYS INVENTOR
WILBUR T. HARRIS
BY
*Mitchell & Bechert*
ATTORNEYS

United States Patent Office 3,109,973
Patented Nov. 5, 1963

3,109,973
DIFFERENTIAL MAGNETOSTRICTIVE
ACTUATOR
Wilbur T. Harris, Southbury, Conn., assignor to The Harris Transducer Corporation, Woodbury, Conn., a corporation of Connecticut
Filed June 9, 1958, Ser. No. 740,932
14 Claims. (Cl. 318—118)

This invention relates to transducers of the type comprising electromechanical material; of tubular or cylindrical form, responsive to electrical excitation to produce mechanical vibrations.

More specifically, the invention relates to novel arrangements of such transducers, to perform desirable functions. The type of transducer to which the invention relates may be divided into two classes, magnetostrictive transducers and electrostrictive or piezoelectric transducers. Magnetostrictive transducers have the property of changing physical dimensions when subjected to an applied magnetic field, and the reciprocal property of modifying an applied magnetic field, when subjected to mechanical stresses. Piezoelectric transducers have the property of changing physical dimensions when subjected to an applied electric field and the reciprocal property of modifying an applied electric field when subjected to mechanical stresses.

It is a general object of the invention to provide improved transducers for transforming energy between electrical and mechanical systems.

It is another object of the invention to provide novel arrangements of such transducers to perform a plurality of circuit functions.

It is a general object of one aspect of the invention to provide improved magnetostrictive transducers.

It is a general object of another aspect of the invention to provide improved piezoelectric transducers.

It is a more specific object of the invention to provide transducers, either magnetostrictive or piezoelectric, which require no temperature compensation when employed in regions of varying ambient temperature.

It is another more specific object of the invention to provide transducers, either magnetostrictive or piezoelectric, which are assembled from a relatively small number of different elements.

Other objects and various further features of novelty and invention will be pointed out or will occur to those skilled in the art from a reading of the following specification in conjunction with the accompanying drawings. In said drawings, which show, for illustrative purpose only, preferred forms of the invention:

FIGURE 1 is a perspective view of a magnetostrictive transducer embodying features of the invention;

FIGURE 2 is a symbolical representation of one magnetostrictive unit of the magnetostrictive transducer shown in FIGURE 1;

FIGURE 3 is an end view of a novel piezoelectric transducer;

Figure 4:
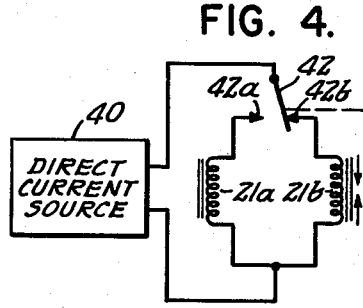
FIGURE 4 is a schematic representation of the magnetostrictive transducer of FIGURE 1, employed as an actuator.

In accordance with an aspect of the invention, the transducer comprises first and second electromechanical elements responsive to electrical excitation and having substantially the same coefficient of magnetostrictive and responsive excitation means for applying electrical energy to the elements. The electrical excitation causes the electromechanical elements to vibrate, which vibrations are coupled to a mechanical system.

Briefly stated, the invention in a preferred form contemplates a device employing two generally similar electromechanical elements which are excited either simultaneously or in alternation, and the difference between mechanical movements of these elements is utilized to develop a mechanical output. The electromechanical elements may be magnetostrictive or peizoelectric, and by suitable choice of materials and/or polarization for one element as compared with the other, the same excitation signal applied to both elements can be caused to develop strong mechanical output, extracted as the differential of the separate mechanical displacements of the two elements.

Referring to FIGURE 1, a transducer 20 is shown, according to one aspect of the invention, for performing energy conversions between an electrical and a mechanical system. The transducer 20 comprises a pair of magnetostrictive units 21a and 21b bonded to a base 31 of non-ferromagnetic material. Bonded respectively across the tops of the magnetostrictive units 21(a—b) are heads 26(a—b). A pivot edge 28 is mounted on the head 26b and a clamping bar 30 is mounted on the head 26a. A lever 32 rests on the pivot edge 28 and is attached to the clamping bar 30. The lever 32 is loaded or biased to bear against the pivot edge 28. This is suggested by the arrow pointing downwardly. Thus, any relative displacement of the heads 26(a—b) along the long axis of the transducer 20, causes related movements of the lever 32.

Each of the magnetostrictive units 21(a—b) includes magnetostrictive elements 22(a—b) which may be bonded stacks of inverted U-shaped laminations 25. A winding 24a threads the stack of laminations associated with the magnetostrictive unit 21a, and a winding 24b threads the stack of laminations associated with the magnetostrictive unit 21b. The laminations 25 are fabricated from the same ferromagnetic material, or materials having the same magnetostrictive coefficients. If the material has a positive magnetostrictive coefficient, it will experience a dimensional expansion, in a direction parallel to an applied magnetic field. Alternatively, if the material has a negative magnetostrictive coefficient, it will contract in an applied magnetic field. Many materials having these properties are available either as cast ferrites or as ferromagnetic sheets. The positive magnetostrictive coefficient materials may be nickel-iron, cobalt-iron or aluminum-iron alloy sheets, or cobalt-nickel ferrites and the negative magnetostrictive coefficient materials may be pure nickel sheets or cast nickel ferrites.

To simplify the discussion, it will be assumed that all the laminations 25 are pure nickel having negative magnetostrictive coefficients. Thus, whenever a magnetic field is established in the magnetostrictive elements 22(a—b), whether it be in a clockwise or counter-clockwise direction, there will be a contraction of the magnetostrictive unit. In some of the embodiments hereinafter discussed, a permanent magnetic field is established in the magnetostrictive elements. The presence of this permanent magnetic field in itself causes a contraction of the magnetostrictive elements. Thus, when another magnetic field is superimposed on the permanent field, there will either be an elongation or contraction of the element. If the superimposed magnetic field is in the same direction as the permanent magnetic field, and assuming the material is not saturated, the dimensional change will be a further contraction, while if the superimposed magnetic field is in an opposite direction, there will be a resulting elongation.

There are three common ways of establishing a permanent magnetic field in the magnetostrictive elements; the lamination material can be both magnetostrictive and have a permanent residual flux; a section of permanent magnet, as is shown in FIGURE 1 by the elements 33a and 33b, is incorporated in the flux paths of each of the magnetostrictive elements; or, as is hereinafter more fully described, direct currents are superimposed on the signals applied to the windings 24a and 24b. It should be noted that when using permanently magnetized magnetostrictive material for the laminations 25 or employing superimposed direct currents in the windings 24a and 24b, it is not necessary to include the elements 33a and 33b in the flux paths of the magnetostrictive elements 22(a—b).

FIGURE 2 shows a symbol which will be employed to represent the magnetostrictive units 21(a—b) in the succeeding illustrations of applications of the transducer 20. Although only a winding 24 is shown, it should be understood that the symbol which includes the arrowheads implies the entire magnetostrictive unit which includes both the windings 24(a—b) and the magnetostrictive elements 22(a—b).

Referring to FIGURE 3, a transducer 120 is shown according to another aspect of the invention for performing energy conversions between an electrical and a mechanical system. The transducer 120 comprises a pair of piezoelectric units 121(a—b) bonded into a socketed base 131. Socketed heads 126(a—b) respectively accommodate the piezoelectric units 121(a—b). A pivot edge 128 is mounted on the head 126b. The lever 132 rests on the pivot edge 128 and is attached to the head 126a via an extension 130. Thus, any relative displacement of the heads 126(a—b) along the long axis, i.e., the elongation axis of the transducer 120, causes related movements of the lever 132.

Each of the piezoelectric units 121(a—b) includes a piezoelectric element 122(a—b). A pair of conductor plates 123(a—b) are positioned on opposite sides of the piezoelectric elements 122a, and a similar pair of conductor plates 124(a—b) are positioned on opposite sides of the piezoelectric element 122b. The piezoelectric elements 122(a—b) are preferably made of a piezoelectric material comprising a mix of lead zirconate and barium titanate which has a residual polarization in a particular direction. When an applied electrostatic field reinforces the polarization there is an elongation of the dimension parallel to the direction of the electrostatic field and a corresponding contraction of the dimension perpendicular to the applied field. When the electrostatic field opposes the residual polarization there is a contraction of the dimension parallel to the applied field and a corresponding elongation in the dimension perpendicular to the applied field.

To simplify the discussion, it will be assumed that the residual polarization of the piezoelectric elements 122(a—b) is as shown in FIGURE 3, and the conductor plates 123a and 124b are connected to a lead 127 for coupling to one terminal of a signal source 145, and the conductor plates 123b and 124a are connected to a lead 129 for coupling to the opposite terminal of the signal source 145. Thus, when the terminal connected to the lead 127 is positive with respect to the terminal connected to the lead 129, there is a reinforcement of the electric field in the piezoelectric element 122b and a diminution of the electric field in the piezoelectric element 122a. The length of the piezoelectric element 122b increases and the length of the piezoelectric element 122a decreases, resulting in a counter-clockwise rotation of the lever 132. When the polarity of the terminals of the signal source 145 reverses, the dimensional changes in the elements 122(a—b) reverse and there is a clockwise rotation of the lever 132. Therefore, if the signal source 145 is a switch operated direct current source, a precision actuator is formed. Each time the switch is closed the lever 132 moves in a direction dependent on the polarity of the voltage across the leads 127 and 129. However, when the signal source 145 is an alternating source, a vibrator is obtained.

In FIGURE 4 the transducer 20 is employed as a precision actuator. The magnetostrictive units 22(a—b) are normally unmagnetized. Current from the direct current source 40 is controllably fed to the windings 24(a—b) via the single pole-double throw switch 42 under the control of a control means 44. When the current flows through the fixed contact 42a, there is a contraction of the magneto-strictive unit 21a causing an upward movement of the lever 32 (FIG. 1). Similarly, when current is received via the fixed contact 42b, there is a contraction of the magnetostrictive unit 21b. Since the lever 32 is normally biased or loaded downwardly, there is a resulting downward movement of the lever 32 (FIG. 1). Thus, directionally controlled movements are obtainable and the transducer 20 operates as a precision actuator.

Figure 5:
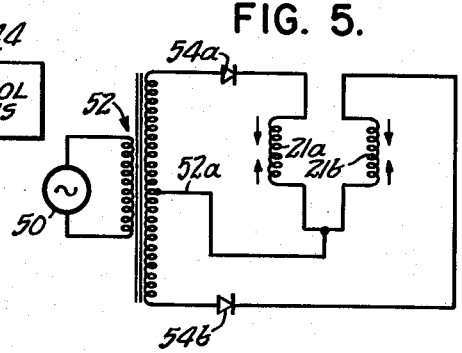
FIGURE 5 is a schematic representation of the magnetostrictive transducer of FIGURE 1 employed as a vibrator.

FIGURE 5 shows the transducer 20 incorporated in a vibrator. The magnetostrictive units 21(a—b) have no permanent magnetization. Current from an alternating current source 50 is fed via the transformer 52 to the full wave rectifier 54(a—b). One end of the windings 24(a—b) is connected to a center tap 52a of the secondary of the transformer 52. The other ends of the windings 24(a—b) are respectively coupled to the cathodes of the diodes 54(a—b). Thus, during the first half of an alternating current cycle, current flows via the diode 54a through the winding 24a, causing a contraction of the magnetostrictive unit 21a and during the other half of the alternating current cycle, current flows through the diode 54b and the winding 24b to cause a contraction of the magnetostrictive unit 21b. These alternating contractions cause the vibration of the lever 32 (FIG. 1).

Figure 6:
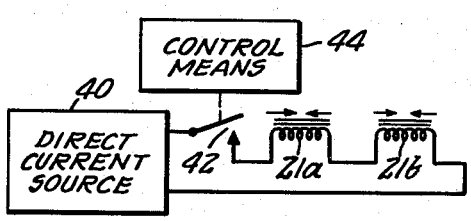
FIGURE 6 is a schematic representation of another embodiment of the actuator of FIGURE 1.

It should be noted that in the two above embodiments, there was a dimensional change in either one of the two magnetostrictive units; i.e., while one contracted, the other was in a rest position. However, in many applications it is highly desirable to provide a differential motion; i.e., while one of the magnetostrictive units contracts, the other magnetostrictive unit elongates. Such differential motion permits smoother operation and in some instances greater lever travel. Accordingly, FIGURE 6 shows a differential actuator. The windings 24(a—b) of the transducer 20 are connected in series and via the single pole-single throw switch 42 to the direct current source 40. The magnetostrictive elements 22b (FIG. 1) of the magnetostrictive unit 21b is permanently magnetized by incorporating the permanently magnetized material 33b in its magnetic flux path. It will be assumed that the permanent magnetic field that is established is in a counter-clockwise direction. The winding 24b is disposed about the magnetostrictive element 22b so that when a direct current flows through the switch 42, the magnetic field induced is in a clockwise direction, resulting in a diminishing of the overall magnetic field in the magnetostrictive element 22b. At the same time there is no permanent magnetization in the magnetostrictive element 22a of the magnetic unit 21a. Therefore, whenever the control means 44 closes the switch 42, there will be a contraction of the magnetostrictive unit 21a and an elongation of the magnetostrictive unit 21b, resulting in a true differential activation of the lever 32.

Figure 7:
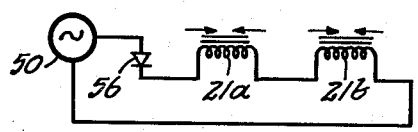
FIGURE 7 is an alternative embodiment of the vibrator of FIGURE 5.

FIGURE 7 shows the transducer 20 operating as a differential vibrator. The windings 24(a—b) are connected in series and via the diode 56 to the alternating current source 50. Again, the magnetostrictive element 22b is permanently polarized by incorporating the permanent magnet 33b (FIG. 1) in its magnetic flux path. It will again be assumed that the permanent magnetic field is in a counter-clockwise direction. The winding 24b is accordingly disposed above the magnetostrictive element 22b so that the magnetic field induced by the current pulses passing through the diode 56 is in a clockwise direction. There is again no permanent magnetization associated with the magnetostrictive element 22a. Therefore, whenever a current pulse is passed by the diode 56, there is a contraction in the magnetostrictive unit 21a and an elongation in the magnetostrictive unit 21b. During the half cycle of alternating current, when no current is passed, the magnetostrictive element 21b contracts to its original dimension and the magnetostrictive unit 21a expands to its original position.

It should be noted that the differential actuator of FIGURE 5 is primarily a uni-directional device; i.e., its associated lever can travel from a rest position either in an upward or a downward motion. Since it is often desirable to provide an actuator which can either be controlled to move from a rest position to a down position or from a rest position to an up position, the magnetostrictive transducer 20 is incorporated in a bi-directional actuator shown in FIGURE 8. Both of the magnetostrictive units 21a and 21b are permanently magnetized. Their associated windings 24(a—b) are connected in series and via the ganged single pole-double throw switches 60 and 62 to the direct current source 40.

Since the operation of the bi-directional differential actuator depends on the increase in the magnetic field in the first magnetostrictive unit 21a accompanied by a decrease in the magnetic field of the magnetostrictive unit 21b or the converse, several winding and polarization arrangements are possible. For example, the windings 24(a—b) may be wound series aiding; i.e., when a current passes through these windings, the magnetic fields induced in the associated magnetostrictive elements are in the same direction, say, clockwise. Then, the associated permanent magnetic fields must be in opposite directions. For example, the permanent magnetic field in the magnetostrictive element 21a is in a clockwise direction while the permanent magnetic field in the magnetostrictive unit 21b is in a counter-clockwise direction. Thus, the current flow reenforces the magnetic field in one of the magnetostrictive units while diminishing the magnetic field in the other magnetostrictive unit. For the conditions assumed there is a contraction of the magnetostrictive unit 21a and an elongation of the magnetostrictive unit 21b. When the windings 24(a—b) are in series opposition; i.e., when current flow through the windings causes oppositely directed magnetic fields, say, a clockwise magnetic field in the magnetostrictive unit 21a and a counter-clockwise magnetic field in the magnetostrictive unit 21b, the permanent magnetization in both of the magnetostrictive units 21(a—b) is in the same direction, say, clockwise. Again current flow causes the reenforcement of one of the magnetic fields and a diminishing of the other magnetic field, resulting for the conditions assumed in an elongation of the magnetostrictive unit 21b and a contraction in the magnetostrictive unit 21a.

Since the ganged switches 60 and 62 control the direction of current flow through the windings 24(a—b), the lever 32 can be moved either upward or downward by controlling the switching positioning with the control means 44.

Figure 8:
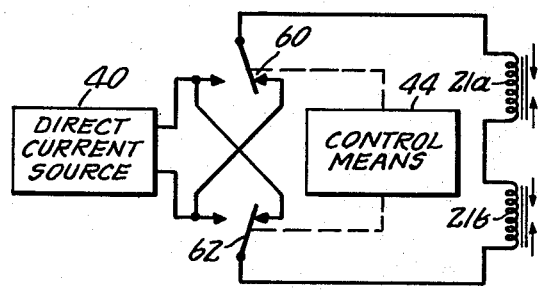
FIGURE 8 is still another embodiment of the actuator.
Figure 9:
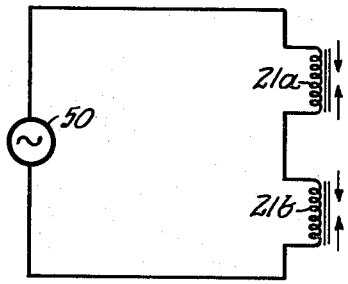
FIGURE 9 is still another embodiment of the vibrator.

By replacing the single pole-double throw switches 60 and 62, and the direct current source 40 of the apparatus of FIGURE 8 by an alternating current source 50, as shown in FIGURE 9, a bi-directional differential vibrator is obtained. Again, it is necessary to dispose the windings 24a and 24b and establish the permanent magnetic fields so that when current flows in one direction, there is an increase in the resulting magnetic field associated with one of the magnetostrictive units and a corresponding decrease in the resulting magnetic field associated with the other magnetostrictive unit. Any of the schemes proposed for the magnetostrictive units of FIGURE 8 can be employed.

Figure 10:
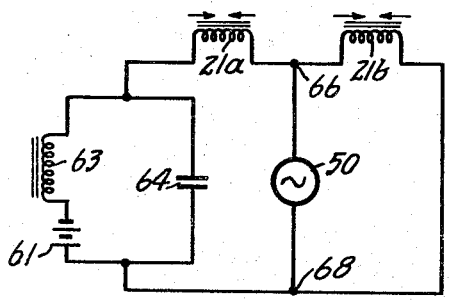
FIGURES 10 and 11 are schematic representations of vibrator circuits in which the magnetostrictive elements are polarized by direct-current.

To further simplify the fabrication of the transducer 20, it may be desirable to create permanent magnetic fields by passing direct current through the windings 24(a—b). Accordingly, FIGURE 10 shows a bi-directional differential vibrator in which the permanent magnetic fields are induced by direct currents. Windings 24(a—b) of the transducer 20 are connected in series across a source of direct current which includes the serially disposed battery 61 and the choke 63 in parallel with the capacitor 64. A source of alternating current 50 is connected across the junctions 66 and 68. Capacitor 64 provides an alternating current bypass around the battery 61 while the choke 63 prevents any alternating current from passing through the battery 61. The windings 24a and 24b may either be series aiding or series opposing. By series opposing it is meant that the same current passing through both windings establishes oppositely directed magnetic fields in their magnetostrictive elements. For example, when the windings 24a and 24b are series aiding, as shown in FIGURE 10, direct current flowing through these windings induces permanent magnetic fields in each of the magnetostrictive units 21(a—b) in, say, counter-clockwise direction. These permanent magnetic fields cause contractions in the magnetostrictive units 21a and 21b. During the half cycle, when the potential of the point 68 is higher than the potential of the point 66, alternating current flows from the alternating current source 50 through the winding 24b to reenforce its magnetic field and there is a further contraction of the magnetostrictive unit 21b. At the same time, alternating current flows via the capacitor 64 into the winding 24a inducing a magnetic field which minimizes the effect of the permanent magnetic field and there is effectively an elongation of the magnetostrictive unit 21a. During the half cycle, when the potential of the junction 66 is greater than the potential of the junction 68, the alternating current passing through the winding 24b induces a magnetic field opposite to the permanent magnetic field and there is an elongation of the unit 21b while the alternating current flowing through the winding 21a reenforces the permanently established magnetic field and there is a contraction of the magnetostrictive element 21a. When the windings 24(a—b) are in series opposition, a similar effect occurs.

Figure 11:
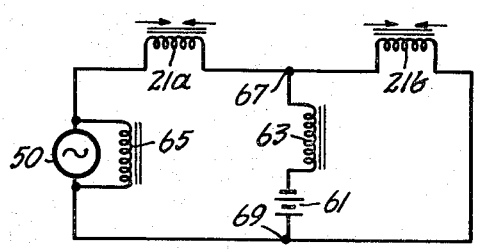

FIGURE 11 shows an alternate embodiment of the apparatus of FIGURE 10. Essentially, there is an interchange in the positions of the alternating and direct current sources. In particular, the windings 24a and 24b of the transducer 20 are serially disposed with the alternating current source 50, while the direct current source, which includes the battery 61 and the choke 63, is coupled between the junctions 67 and 69 to permit the "out of phase" feeding of direct current to the windings 24a and 24b. The choke 63 prevents the passage of alternating currents through the direct current source 61 while a choke 65 acts as a direct current bypass about the alternating current source 50. Either series aiding or series opposing disposition of the windings 24a and 24b is possible.

There have thus been shown improved electromagnetostrictive transducers which can efficiently and precisely transfer energy between electrical and mechanical systems. In particular, the electro-magnetostrictive transducers, whether magnetostrictive or piezoelectric, require no temperature compensation in regions of varying ambient temperature since the elements are of the same material. Since the elements can be identical, a fewer number of components are required in the overall fabrication of the assembly.

Further, piezoelectric transducers have been shown which may either be used as actuators or vibrators. Likewise, magnetostrictive transducers have been shown, along with a plurality of different circuit configurations, which permit using the magnetostrictive transducers for both vibrators and actuators.

While the invention has been described in detail in connection with the preferred forms illustrated, it will be understood that modifications may be made within the scope of the invention as defined in the claims which follow.

I claim:

1. A transducer for transferring electrical energy to mechanical motion comprising a first piezo-electric element, a pair of conductor plates disposed on opposite sides of said first piezoelectric element, a second piezoelectric element formed of the same piezoelectric material as said first piezoelectric element, a second pair of conductor plates disposed on opposite sides of said second piezoelectric element, a source of voltage, means for coupling said source of voltage to said pairs of conductor plates including means for controlling the application of said voltage thereto, lever means movably responsive to the movement of said first and second piezoelectric elements, and an operative connection between said lever means and said controlling means for actuating said controlling means in response to movement of said lever means.

2. A transducer for transferring electrical energy to mechanical motion comprising first and second elements each formed of the same electromechanical material, first and second actuating means associated with said first and second elements respectively and adapted to be variably electrically energized to cause said elements to change their physical dimensions in accordance with the changes in said electrical energization, a source of electrical energy, means including a switch operatively connected between said source and said actuating means, a movable mechanical member operatively connected to said elements to be moved thereby as their physical dimensions change, and an operative connection between said member and said switch for actuating said switch in response to movement of said member.

3. The transducer of claim 2, in which said first and second actuating means are electrically connected in parallel, said switch alternately connecting one or the other of said actuating means to said source.

4. The transducer of claim 2, in which said first and second actuating means are electrically connected in series, said switch alternately connecting said actuating elements to and disconnecting said actuating elements from said source.

5. The transducer of claim 2, in which said first and second actuating means are electrically connected in series, said switch controlling the direction of current flow through said actuating means.

6. A transducer for transferring electrical energy to mechanical motion comprising first and second elements each formed of the same electromechanical material, first and second actuating means associated with said first and second elements respectively and adapted to be variably electrically energized to cause said elements to change their physical dimensions in accordance with changes in said eelctrical energization, a source of electrical energy, means including a switch operatively connected between said source and said actuating means, a movable lever member operatively connected to said elements to be moved thereby as their physical dimensions change, and an operative connection between said member and said switch for actuating said switch in response to movement of said member.

7. The transducer of claim 6, in which said first and second actuating means are electrically connected in parallel, said switch alternately connecting one or the other of said actuating means to said source.

8. The transducer of claim 6, in which said first and second actuating means are electrically connected in series, said switch alternately connecting said actuating elements to and disconnecting said actuating elements from said source.

9. The transducer of claim 6, in which said first and second actuating means are electrically connected in series, said switch controlling the direction of current flow through said actuating means.

10. A transducer for converting electrical energy to mechanical motion comprising a first element of magnetostrictive material, a first winding disposed about said magnetostrictive element, a second magnetostrictive element of the same magnetostrictive material, a second winding disposed about said second magnetostrictive element, said first and second windings being serially connected, means for establishing a permanent field in at least one of said elements, a source of current, means for controlling the current flow through said first and second windings from said source of current, the flow of current in a given direction through the winding associated with said one of said elements producing a magnetic field which combines with said permanent magnetic field, lever means movably responsive to the physical state of said first and second elements, and an operative connection between said lever means and said means for controlling said current flow for actuating said current controlling means in response to movement of said lever means.

11. A transducer for coupling between an electrical network and a mechanical system, comprising first and second magnetostrictive elements having the same magnetostrictive characteristics, said first and second elements being spaced from each other, winding means developed about portions of said first and second elements and coupled to the electrical network, a first lever-supporting means connected to an end of said first magnetostrictive element, a second lever-supporting means connected to a corresponding end of said second magnetostrictive element, lever means connected to said first and second lever-supporting means for coupling to the mechanical system, means for controlling the coupling of said winding means to said electrical network, and an operative connection between said lever means and said coupling-control means for actuating said coupling-control means in response to movement of said lever means.

12. The transducer of claim 11, in which means are included for establishing a steady magnetic polarization in at least one of the magnetostrictive elements.

13. A transducer for coupling between an electrical network and a mechanical system, comprising first and second magnetostrictive elements spaced from one another, winding means developed about portions of said first and second magnetostrictive elements and coupled to the electrical network, a first lever-supporting means connected to an end of said first magnetostrictive element, a second lever-supporting means connected to a corresponding end of said second magnetostrictive element, lever means connected to said first and second lever-supporting means for coupling to the mechanical system, means for controlling the coupling between said winding means and said electrical network, and an operative connection between said lever means and said coupling-controlling means for actuating the latter in response to movement of said lever means.

14. A transducer for converting electrical energy to mechanical motion comprising a first element of magnetostrictive material, means establishing a permanent magnetic field in said magnetostrictive element, a first winding disposed about said magnetostrictive element, a second magnetostrictive element of the same magnetostrictive material, means for establishing a permanent magnetic field in said second magnetostrictive element, a second winding disposed about said second magnetostrictive element, said first and second windings being serially connected, a source of current, means for controlling the current flow through said first and second windings from said source of current, the flow of current through said first winding establishing a magnetic field in said first magnetostrictive element which reenforces the permanent magnetic field while the same current flowing in said second winding establishes a magnetic field which opposes the established magnetic field, and lever means movably responsive to the physical state of said first and second elements, and an operative connection between said lever means and said means for controlling said current flow for actuating said current controlling means in response to movement of said lever means.

References Cited in the file of this patent

UNITED STATES PATENTS

| | | | |
|---|---|---|---|
| 1,438,974 | Wente | Dec. 19, | 1922 |
| 2,441,158 | Krasnow | May 11, | 1948 |
| 2,550,771 | Camp | May 1, | 1951 |
| 2,621,260 | Sykes | Dec. 9, | 1952 |
| 2,745,998 | McPherson | May 15, | 1956 |
| 2,847,558 | Herbert | Aug. 12, | 1958 |
| 2,848,672 | Harris | Aug. 19, | 1958 |
| 3,007,063 | Harris | Oct. 31, | 1961 |